US010838948B2

(12) United States Patent
Wild et al.

(10) Patent No.: US 10,838,948 B2
(45) Date of Patent: Nov. 17, 2020

(54) SWITCH CONFIGURATION TROUBLESHOOTING

(71) Applicant: HEWLETT PACKARD ENTERPRISE DEVELOPMENT LP, Houston, TX (US)

(72) Inventors: Christopher Wild, Santa Clara, CA (US); Michael Zayats, Santa Clara, CA (US); David Rodrigues Pinheiro, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/966,114

(22) Filed: Apr. 30, 2018

(65) Prior Publication Data

US 2019/0332700 A1 Oct. 31, 2019

(51) Int. Cl.
*G06F 16/23* (2019.01)
*H04L 12/947* (2013.01)
*H04L 12/24* (2006.01)

(52) U.S. Cl.
CPC ...... *G06F 16/2365* (2019.01); *G06F 16/2379* (2019.01); *H04L 49/25* (2013.01); *H04L 41/08* (2013.01)

(58) Field of Classification Search
CPC ......... G06F 17/30371; G06F 17/30377; H04L 49/25; H04L 41/08
See application file for complete search history.

(56) References Cited

U.S. PATENT DOCUMENTS

| 5,668,860 | A | * | 9/1997 | Andruska | ......... H04M 3/42314 |
| | | | | | 370/385 |
| 6,141,565 | A | * | 10/2000 | Feuerstein | ............ H04W 16/06 |
| | | | | | 455/422.1 |
| 7,069,480 | B1 | | 6/2006 | Lovy et al. | |
| 7,730,201 | B1 | * | 6/2010 | McAllister | .......... H04L 12/5602 |
| | | | | | 709/233 |
| 2011/0085560 | A1 | * | 4/2011 | Chawla | ................. H04L 45/586 |
| | | | | | 370/401 |

(Continued)

OTHER PUBLICATIONS

Cisco Traffic Anomaly Detector Module, (Web Page), Jan. 6, 2014, 9 Pgs.

(Continued)

*Primary Examiner* — Ashish Thomas
*Assistant Examiner* — Dustin D Eyers
(74) *Attorney, Agent, or Firm* — Hewlett Packard Enterprise Patent Department (57) ABSTRACT

Examples disclosed herein relate to a method comprising monitoring a first condition corresponding to a first parameter in a first database. The first database is configured to operate a first switch operating traffic on a network and the first database periodically synching with a second database. The method may also include monitoring a second parameter, corresponding to the first parameter, on the second database. The second database may be configured to operate a second switch on the network and the first switch and the second switch configured to operate traffic on the network. The method may also include determining that there is a deviation between the first and second that exceeds a threshold amount and transmitting an alert containing the deviation.

20 Claims, 5 Drawing Sheets

(56) References Cited

U.S. PATENT DOCUMENTS

| | | |
|---|---|---|
| 2011/0086600 A1* | 4/2011 | Muhammad ......... H04B 1/0458 |
| | | 455/120 |
| 2015/0149617 A1* | 5/2015 | Lai ......................... H04L 43/08 |
| | | 709/224 |
| 2015/0195102 A1 | 7/2015 | Mochida et al. |
| 2015/0199416 A1 | 7/2015 | Kashyap et al. |
| 2015/0271008 A1 | 9/2015 | Jain et al. |
| 2016/0112252 A1* | 4/2016 | Notari ................. H04L 41/0843 |
| | | 709/221 |
| 2016/0248623 A1* | 8/2016 | Matsuura ........... H04Q 11/0066 |
| 2016/0337863 A1* | 11/2016 | Robinson .............. H04W 12/08 |
| 2016/0345215 A1* | 11/2016 | Åström et al. ...... H04L 67/2809 |
| 2016/0366022 A1* | 12/2016 | Finkelstein ............. H04L 41/12 |
| 2017/0207948 A1 | 7/2017 | Ratakonda et al. |
| 2017/0278007 A1* | 9/2017 | Anchuri ............... G06N 99/005 |
| 2018/0034686 A1* | 2/2018 | Vaidyanathan ..... H04L 41/0677 |

OTHER PUBLICATIONS

How to Troubleshoot Common Routers and Switches Issues, (Web Page), 2 Pgs.

\* cited by examiner

SWITCH CONFIGURATION TROUBLESHOOTING

BACKGROUND

A network device, such as a switch, may be configured to operate network traffic in a desired way. It may be beneficial to detect anomalies and/or errors in the configuration.

BRIEF DESCRIPTION OF THE DRAWINGS

The following detailed description references the drawings, wherein.

DETAILED DESCRIPTION

Traditionally, a network device, such as a switch, may be configured by a text file or the like. For example, many switches may be configured via Command-Line Interface (CLI). In order to troubleshot the configuration of the first switch with a peer switch the text file may be transmitted from one switch to the other switch. In other words, the configuration data to be synchronized may be buffered up by the first switch and transmitted to the peer switch. Once received, the configuration data may be saved to the configuration file of the peer switch.

The present disclosure describes aspects of systems and methods for switch configuration troubleshooting in an architecture utilizing an active/active dual switch virtualized high availability solution. The two independent switches may utilize a connected link for control and data. The solution allows the switches to present as one virtualized switch.

A benefit of the architecture is compatibility with modern protocols and standards. Whereas text-based configurations, such as CLI, may be a more rigid approach due to the ordering issues discussed above, aspects of the system disclosed herein may be better suited for modern programmable standards, such as REST, which would allow a user to programmatically set up events and responses using the configuration database as well as allow for customized logging.

Each switch may utilize a corresponding database to configure and/or operate the switch. These databases may store configuration, status, states and statistics of the system. The systems and methods may leverage the database, which may include a specialized time series database, to correlate and analyze a variety of system data, triggering troubleshooting routines when an anomaly is detected and also providing a history of events leading to a root cause.

Aspects of the system and method described herein can troubleshoot network issues across both independent switches—by correlating local and remote data in a unique, normalized fashion. Moreover, the system allows certain functionality to trigger on user driven routines when, for example, detection of MAC address counts on the first device versus the second device exceeds percentage deviation threshold.

A method for switch configuration troubleshooting may include monitoring a first condition corresponding to a first parameter in a first data base, wherein the first database is configured to operate a first switch operating traffic on a network, the first database periodically synching with a second database. The method may also include monitoring a second parameter, corresponding to the first parameter, on the second database, wherein the second database is configured to operate a second switch on the network, the first switch and the second switch configured to operate traffic on the network. The method may also include determining that there is a deviation between the first and second that exceeds a threshold amount and transmitting an alert containing the deviation.

Figure 1A:
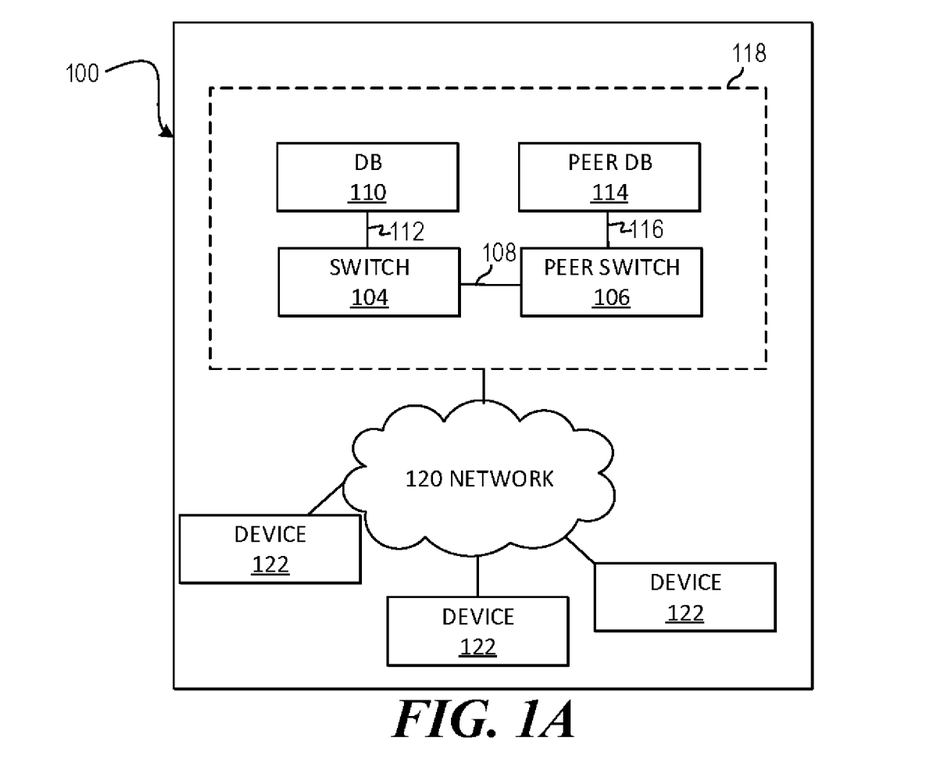
FIG. 1A is a block diagram of an example system where switch configuration troubleshooting may be useful.

FIG. 1A is a block diagram of an example system 100 where switch configuration troubleshooting may be useful. System 100 may implement a database driven network switch architecture. The system 100 may include a first switch 104 and a peer switch 106 connected by a link 108. First switch 104 may be connected to a database 110 via a link 112 and peer switch 106 may be connected to a second database 114 via a link 116. Links 108, 112 and 116 may be a physical link, such as an Ethernet connection or other physical connection, a wireless connection, a virtual connection, etc.

A network switch, such as switch 104 and peer switch 106, may have routing capabilities such that the switch is responsible for routing data along a route (or equivalently, path) in a network 120. The switch may perform routing of data based on routing information accessible by the router. For example, the routing information can be stored on a storage medium of the router, or on a storage medium separate from but accessible by the router.

A database, such as a time series database 110 and second database 114, may store some or all of the configuration, status, states and statistics of the network 120, the switches 104 and 106 and/or other devices on the network 120 at any given point at time. The different state data may be accessed from the databases 110 and 114 either individually (data for a given time, a given device, etc.) or in aggregate (data aggregated for particular items over a given time period, etc.). In other words, the state of the switch may be retrieved from any arbitrary state to any other arbitrary state by manipulating the database. The switch 104 and/or 106 may respond to these manipulations by reconfiguring itself to and perform any functionality required to achieve that state.

In this manner, the switches 104 and/or 106 access to numerous data points of information for devices 122 on the network 120 and the network 120 itself at different points in time. This also provides the switches 104 and/or 106 with a wide variety of information for monitoring, analysis, troubleshooting, etc.

In an environment utilizing a switch, there may be a need for a high availability. High availability may refer to a system and/or component that continuously operates for a long length of time. This time period may be represented as a percentage of uptime. For example, there may be a desirability to have a networking switch be available for 99.9% of up time. Of course this is an example percentage and other amounts of up time may be acceptable and/or desirable in a given environment.

The network 120 may also implement an active/active switching architecture. In this architecture, multiple switches, typically two (such as switch 104 and peer switch 106), are configured to service the network 120. In other words, the architecture includes two switches to mirror the traffic in between them and can act as a redundant system. If one switch goes down, the other can take over without a user having to take action.

Specifically, the first switch 104 may access a first database 110 configured to service the network 120. The peer switch 106, may access the second database 114 and the second database 114 may be synchronized to the first database 110. The first 104 and peer switch 106 may be connected to each other for control and data transfer. Moreover, the combination of the first switch 104 and the peer switch 106 may be presented to the user as a single virtualized switch 118. In the event that the first switch 104 goes down, no traffic may be lost, although the total amount of bandwidth available to the system may be reduced. Moreover, this architecture provides the ability to configure one switch 104 and have the configuration synced to the peer switch 106. This keeps the network facing elements consistent across management changes to allow for load balancing and high availability in case of failure.

Virtualized system 118 may allow a user to visualize and/or access the system 100 as a whole logically through one interface. The architecture may allow a user to discover certain conditions (such as anomalies, errors, etc.) in the system 100 in a programmable manner. Accordingly, a user may set certain database parameters, conditions in the network 120, for monitoring. For example, one or more VLANs may be monitored in the network (via, for example, a user created script). In the event that a VLAN in the network changes status (i.e. from active to non-active), a user and/or device may be notified, presented via a variety of information about the VLAN and devices running the VLAN as well as possible remedial actions to remedy the problem. In some aspects, these remedial actions may be automatically performed.

In addition to discovering and detecting events, anomalies, conditions, etc., errors may be dealt with programmatically. For example, if certain parameters meet certain conditions, certain actions to correct these parameters or other network conditions may be performed and/or a user may be notified to take manual intervention steps. Similarly, the parameters can be monitored over a certain period of time and the parameters can be compared over the period of time and/or compared to historical data. Additionally, a set of repeatable actions can be programmed to occur in certain circumstances based on the monitored parameters and/or other parameters. These automated responses may be programmed via REST, Ansible, as well as other scripting languages that can access data stored in a database.

Figure 1B:
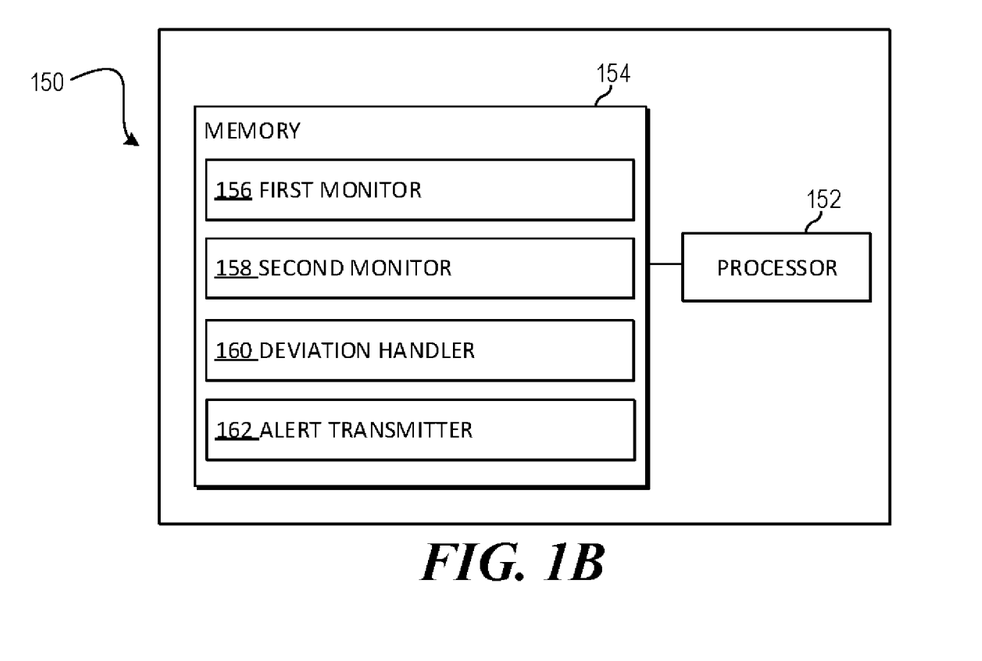
FIG. 1B is a block diagram of another example system for switch configuration troubleshooting.

Turning now to FIG. 1B, a block diagram of an example system 150 for switch configuration troubleshooting. System 150 may include a processor 152 and a memory 154 that may be coupled to each other through a communication link (e.g., a bus). Processor 152 may include a single or multiple Central Processing Units (CPU) or another suitable hardware processor(s). In some examples, memory 154 stores machine readable instructions executed by processor 152 for system 150. Memory 154 may include any suitable combination of volatile and/or non-volatile memory, such as combinations of Random Access Memory (RAM), Read-Only Memory (ROM), flash memory, and/or other suitable memory.

Memory 154 stores instructions to be executed by processor 152 including instructions for first monitor 156, second monitor 158, deviation handler 160, alert transmitter 162, and/or other components. According to various implementations, system 150 may be implemented in hardware and/or a combination of hardware and programming that configures hardware. Furthermore, in FIG. 1B and other Figures described herein, different numbers of components or entities than depicted may be used.

Processor 152 may execute first monitor 156 to monitor a first condition corresponding to a first parameter in a first data base. The first database may be configured to operate a first switch operating traffic on a network and the first database may periodically synch with a second database.

Processor 152 may execute second monitor 158 to monitor a second parameter, corresponding to the first parameter, on the second database, wherein the second database is configured to operate a second switch on the network, the first switch and the second switch configured to operate traffic on the network. For example, the first switch may be unable to operate traffic on the network due to a variety of errors, power outage, etc.

Both the first and the second switch may be configured, via the first and second databases, respectively, to actively manage the network. The first and the second switch may be configured to appear as a single virtual switch in a management pane. The first switch may subscribe to the second database to receive data related to the second parameter.

Processor 152 may execute deviation handler 160 to determine that there is a deviation between the first and second that exceeds a threshold amount. In some aspects, the first parameter may be a count of a number of entities of a type on the network and the deviation may be a difference between a first count of the number of entities saved in the first database and a second count of the number of entities saved in the second database. In some aspects, first parameter may be a first count of a number of entities of a type on the network, the second parameter may be a second count of the number of entities of the type on the network and the deviation may be a difference between the first count of the number of entities saved in the first database and the second count of the number of entities saved in the second database Processor 152 may execute alert transmitter 162 to transmit an alert containing the deviation. In some aspects, the system 150 may also perform an operation to correct the deviation between the first and second parameter.

Figure 2:
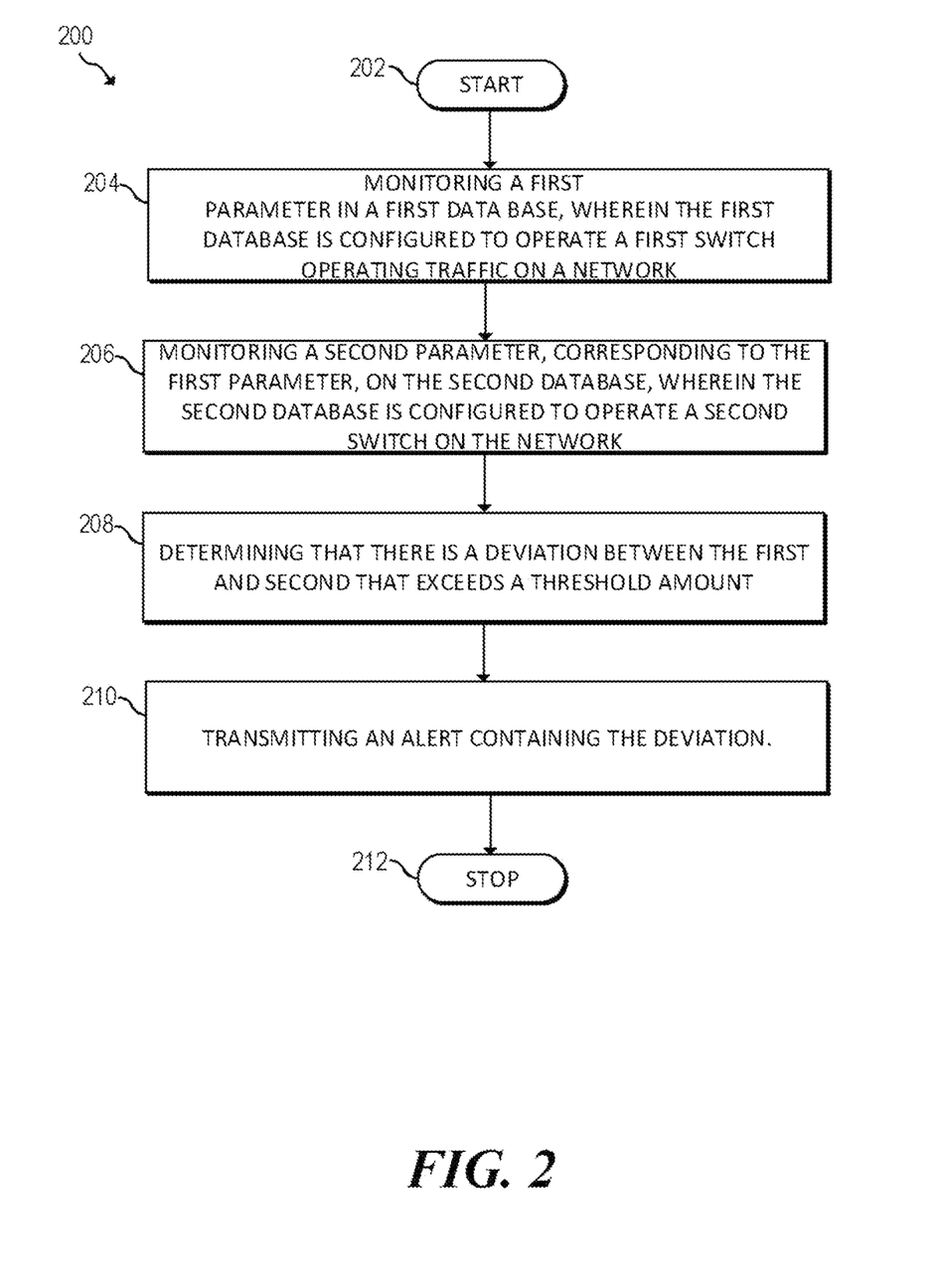
FIG. 2 is a flowchart of an example method for monitoring conditions in switch configuration databases.
Figure 3:
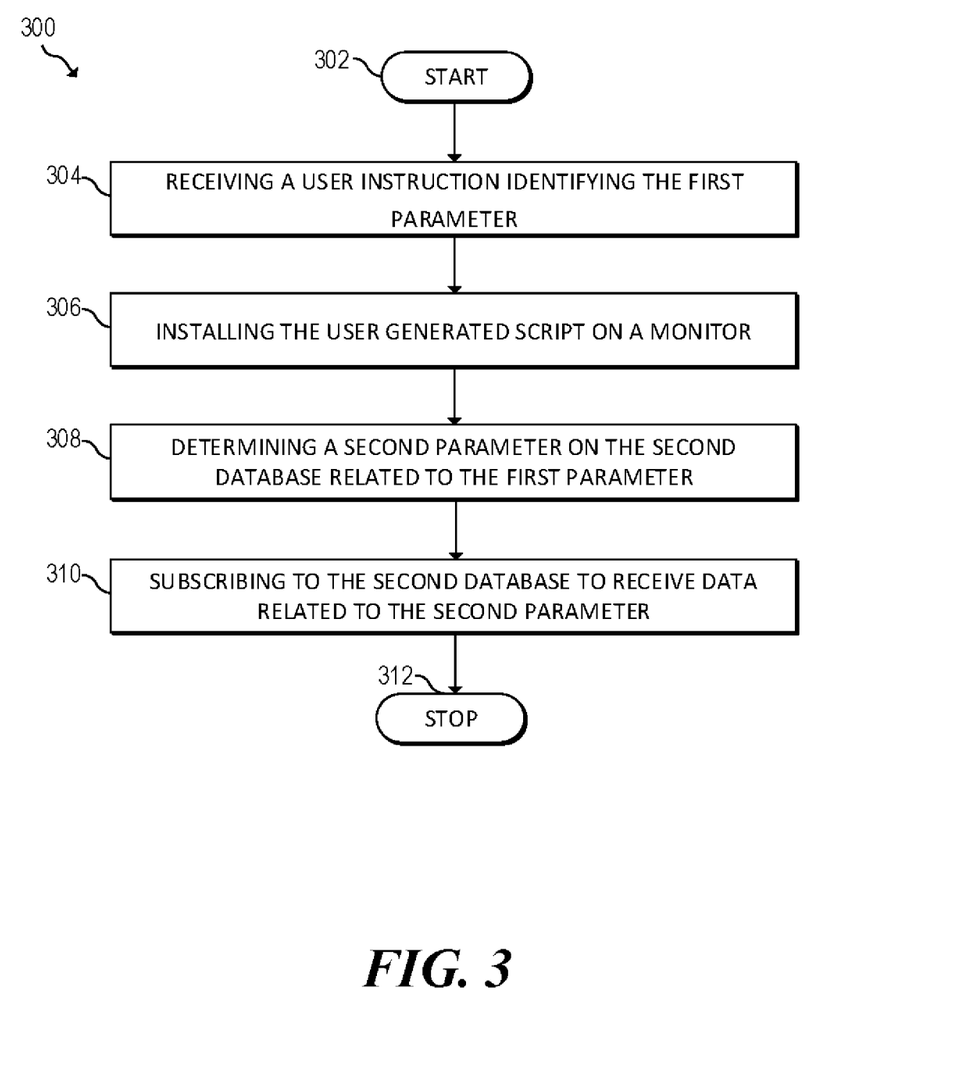
FIG. 3 is a flowchart of an example method for switch configuration troubleshooting.
Figure 4:
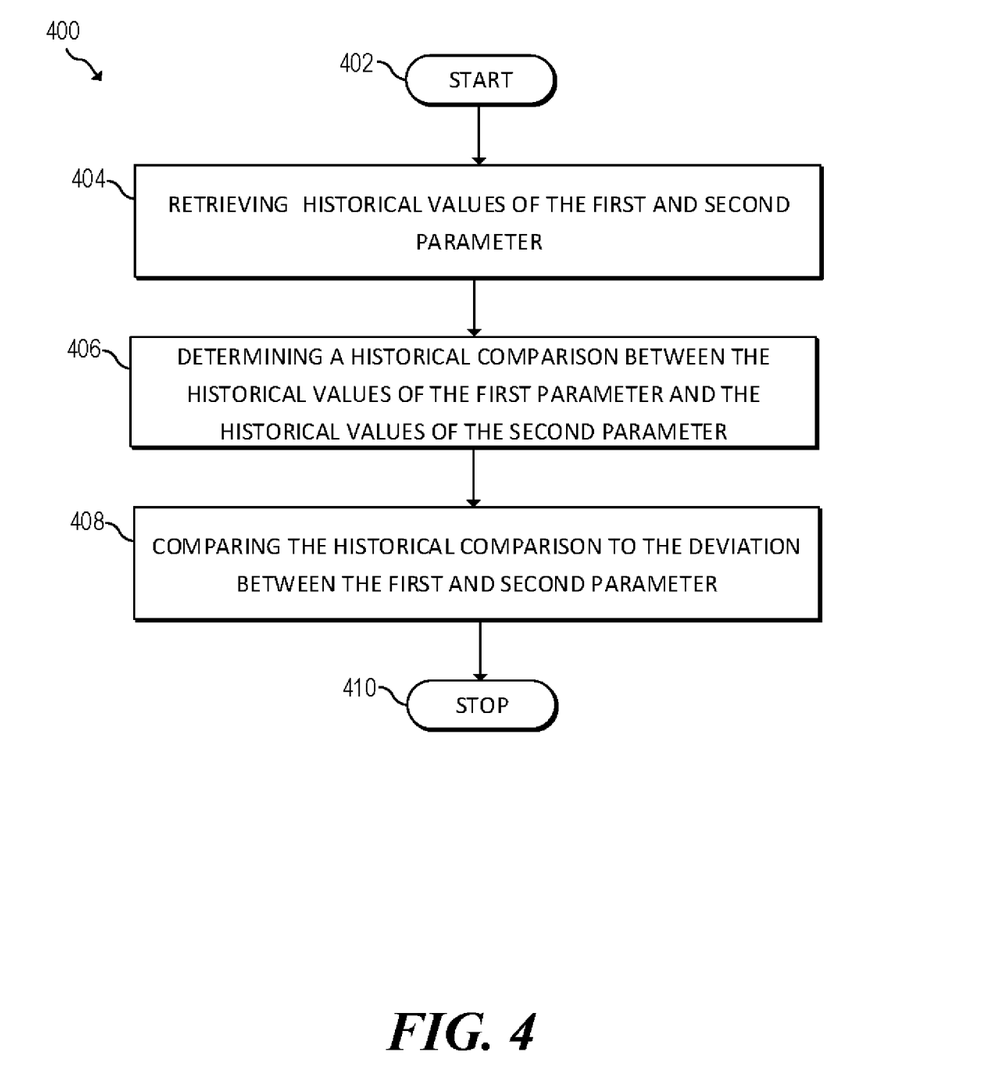
FIG. 4 is a flowchart of an example method for using historical data in switch configuration troubleshooting.

Referring now to FIGS. 2-4, flow diagrams are illustrated in accordance with various examples of the present disclosure. The flow diagrams represent processes that may be utilized in conjunction with various systems and devices as discussed with reference to the preceding figures, such as, for example, system 100 described in reference to FIG. 1A, system 150 described in reference to FIG. 1B and/or system 500 described in reference to FIG. 5. While illustrated in a particular order, the flow diagrams are not intended to be so limited. Rather, it is expressly contemplated that various processes may occur in different orders and/or simultaneously with other processes than those illustrated. As such, the sequence of operations described in connection with FIGS. 2-4 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

FIG. 2 is a flowchart of an example method 200 for monitoring conditions in switch configuration databases. For example, method 200 may be used in an environment similar to system 100, described above in reference to FIG. 1A. Sample database used in conjunction with the method and system of FIG. 1A may be an Open vSwitch Database (OVSDB). The databases may have a plurality of rows and unique identifiers for the rows.

Method 200 may start at block 202 and continue to block 204, where the method 200 may include monitoring a first condition corresponding to a first parameter in a first data base. The first database may be configured to operate a first switch operating traffic on a network and the first database may periodically synch with a second database. At block 206, the method may include monitoring a second parameter, corresponding to the first parameter, on the second database. The second database may be configured to operate a second switch on the network and the first switch and the second switch configured to operate traffic on the network. For example, the first switch may be unable to operate traffic on the network due to a variety of errors, power outage, etc.

Both the first and the second switch may be configured, via the first and second databases, respectively, to actively manage the network. The first and the second switch may be configured to appear as a single virtual switch in a management pane. The first switch may subscribe to the second database to receive data related to the second parameter.

The method can be used to monitor certain data on the first switch and the peer switch. For example, the data may be a parameter such as a number of routes in a network. If the routes stored in a configuration database are not correct, traffic may hit an unknown and/or misconfigured device causing an outage. Accordingly, in an architecture where the first and peer switches are in an active/active redundant architecture (such as the system 100 described above in reference to FIG. 1), the number of routes registered in the first database (used for configuring the first switch) and the number of routes in the second database (used for configuring the peer switch) should be the same or nearly the same. Of course, the number of routes is an example parameter and other types of data may be monitored. For example, the method may be used to monitor specific differences in entries in the database, types of data in the database, number of entities sharing a device type (i.e. number of MAC devices), the number of unique entities sharing a device type (i.e. number of unique MAC devices on the network), counts of information (i.e. number of Internet Group Management protocol (IGMP) routes, etc.).

As another example, the system may periodically retrieve Address Resolution Protocol (ARP) information and compare it to a threshold amount. Other examples of information that may be retrieved and checked against threshold are parameters used to maintain the virtualized links between the first and peer switch, such as Link Aggregation Control Protocol (LACP) statistics between the switches as well as Link Aggregation (LAG) interface counters.

At block 208, the method may include determining that there is a deviation between the first and second parameter that exceeds a threshold amount. In some aspects, the first parameter may be a count of a number of entities of a type on the network and the deviation may be a difference between a first count of the number of entities saved in the first database and a second count of the number of entities saved in the second database. In some aspects, first parameter may be a first count of a number of entities of a type on the network, the second parameter may be a second count of the number of entities of the type on the network and the deviation may be a difference between the first count of the number of entities saved in the first database and the second count of the number of entities saved in the second database.

At block 210, the method may include transmitting an alert containing the deviation. The alert may include a variety of information, such as data corresponding to the first and second parameter, historical data corresponding to the first and second parameter, data corresponding to parameters related to the first and second parameter, generalized network information, etc. In some aspects, the method may include performing an operation to correct the deviation between the first and second parameter. The method may proceed to block 212, where the method may end.

Referring the example scenario discussed above in reference to blocks 204-206, the number of routes may not be exactly the same for a variety of reasons, such as if the database have not synchronized in a certain amount of time, if the configuration changed on one of the switches because of an event that occurred on the network, etc. Because there may be natural reasons for the parameter to differ between the switches, a user may wish to set some sort of threshold deviation. For example, rather than being alerted each time the number of routes is different, the user may set a threshold to be provided with a notification when the difference in the number of routes exceeds the threshold. When that threshold is exceed, information from the first and/or second database concerning the number of routes may be retrieved and presented to the user along with the notification.

FIG. 3 is a flowchart of an example method 300 for switch configuration troubleshooting. Method 300 may start at block 302 and continue to block 304, where the method 300 may receive a user instruction identifying the first parameter. For example, a user may create a script in order to monitor the MAC entries on the first and second database. Accordingly, the first parameter may be the number of MAC entries on the first database and the second parameter (discussed below) may be the number of MAC entries on the second database. The script may be used to monitor the number of MAC entries in each database as well as the number and identify of unique MAC entries in each database. If, for example, there are 3 MAC addresses in the primary database and 2 unique mac addresses in the peer database, the unique MAC addresses may be compared among the Databases and the unique MAC address not featured in the peer switch may be presented to the user.

The script may also set a threshold deviation. For example, the script may specify that if there is a deviation of more than 2 switches, then the user should be alerted. The script may also specify one or more actions to be taken in the event of a deviation. The actions may be notification actions, such as to create an alert to notify the user, a remedial action, such as to make a change to a route, a device, etc., or some other type of action. Of course, the MAC entry scenario described is an example for demonstration purposes and other types of data may be monitored.

At block 306, the method may include installing the user generated script on a monitor. The monitor may be an application, such as an analytics engine, executing on one of the switches, such as the first switch and/or second switch, or may be part of another device. A monitor, such as an analytics engine, may execute the script. At block 308, the method may include determining a second parameter on the second database related to the first parameter. At block 310, the method may include subscribing to the second database to receive data related to the second parameter. Accordingly, the monitor may then periodically receive information relating to the second parameter from the second database. In some aspects, the monitor may additionally or alternatively subscribe to the first database to receive information relating to the first parameter.

In this manner, the method may be used to monitor the databases by periodically checking for the requested parameter and/or atomically receiving data concerning the parameter at certain intervals. Moreover, the monitor may get notifications anytime a parameter matching that type is added, removed, updated, etc. Using the MAC address example, the monitor may receive a notification anytime a new MAC address is added, removed and/or updated to one or more of the databases. Each time the monitor receives information, either from the primary or peer databases, the monitor may compare the parameters to determine if the threshold is met. If the threshold is met, a notification may be created to inform a user. The monitor may have a series of scripts and/or commands that are to be executed when different thresholds are met. One example command may be a Command Line Interface (CLI) command, may be executed to compare the unique MAC address count in the primary database to the unique MAC address count in the peer database. The output of this command may be saved. This is an example command for illustration purposes and other commands and scripts may be used in conjunction with a variety of standards, protocols and languages. In another aspect, a user may identify certain parameters that and data related to those parameters may be periodically retrieved and compared to threshold amounts.

Accordingly, when the threshold is met, the monitor may identify a corresponding script and execute the corresponding script. The monitor may also use a third database to save the received data with time data to create a historical record.

The method may proceed to block 312, where the method may end.

FIG. 4 is a flowchart of an example method 400 for using historical data in switch configuration troubleshooting. When a deviation is detected, such as the deviation discussed above in reference to block 208 of method 200, the user may be presented with a variety of historical data concerning the parameters in the deviation. Method 400 may start at block 402 and continue to block 404, where the method 400 may include retrieving historical values of the first and/or second parameter. The historical values may be the same as the historical values discussed in the example above in reference to block 310 of method 300. At block 406, the method may include determining a historical comparison between the historical values of the first parameter and the historical values of the second parameter. At block 408, the method may include comparing the historical comparison to the deviation between the first and second parameter. The method may proceed to block 410, where the method may end.

Figure 5:
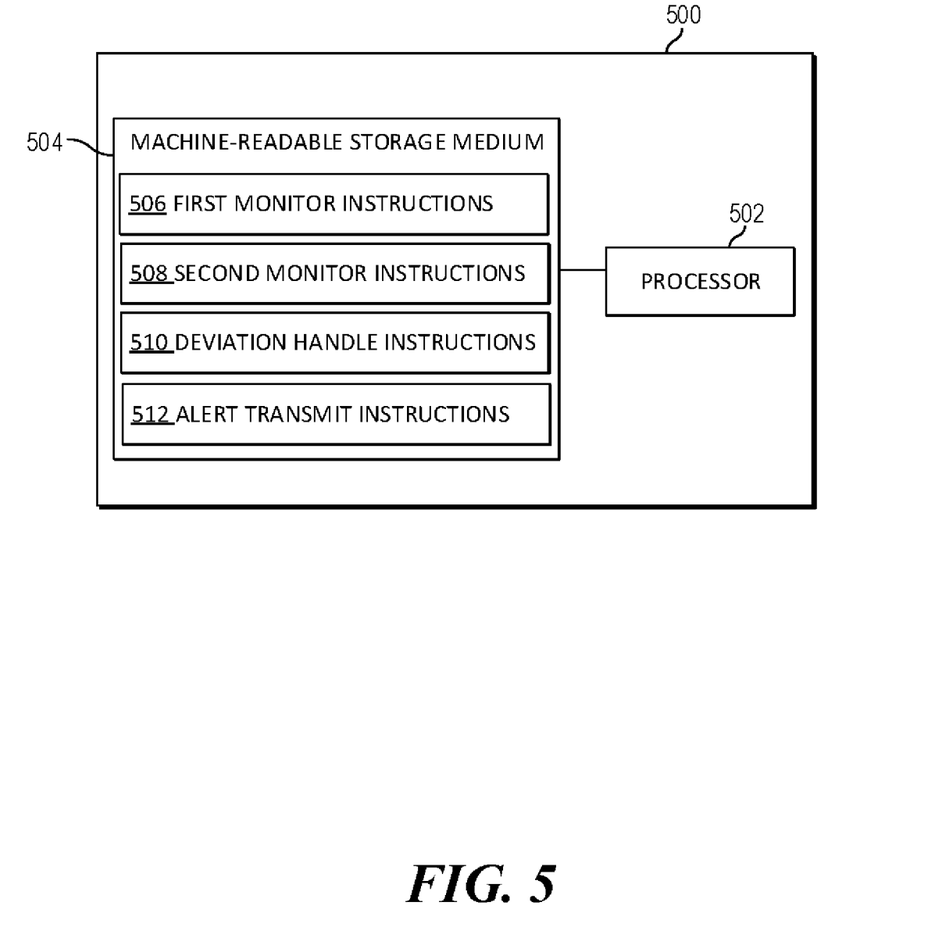
FIG. 5 is a block diagram of another example system for switch configuration troubleshooting.

FIG. 5 is a block diagram of an example system 500 for server configuration troubleshooting. In the example illustrated in FIG. 5, system 500 includes a processor 502 and a machine-readable storage medium 504. In some aspects, processor 502 and machine-readable storage medium 504 may be part of an Application-specific integrated circuit (ASIC). Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 may be at least one central processing unit (CPU), microprocessor, and/or other hardware devices suitable for retrieval and execution of instructions stored in machine-readable storage medium 504. In the example illustrated in FIG. 5, processor 502 may fetch, decode, and execute instructions 506, 508, 510 and 512 for server configuration troubleshooting. Processor 502 may include at least one electronic circuit comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for context aware data backup. The machine-readable storage medium may be non-transitory.

Referring to FIG. 5, first monitor instructions 506, when executed by a processor (e.g., 502), may cause system 500 to monitor a first condition corresponding to a first parameter in a first database. The first database may be configured to operate a first switch operating traffic on a network and the first database may periodically synchronize with a second database. Second monitor instructions 508, when executed by a processor (e.g., 502), may cause system 500 to monitor a second parameter, corresponding to the first parameter, on the second database. The second database may be configured to operate a second switch on the network and the first switch and the second switch configured to operate traffic on the network. For example, the first switch may be unable to operate traffic on the network due to a variety of errors, power outage, etc.

Both the first and the second switch may be configured, via the first and second databases, respectively, to actively manage the network. The first and the second switch may be configured to appear as a single virtual switch in a management pane. The first switch may subscribe to the second database to receive data related to the second parameter.

Deviation handle instructions 510, when executed by a processor (e.g., 502), may cause system 500 to determine that there is a deviation between the first and second that exceeds a threshold amount. In some aspects, the first parameter may be a count of a number of entities of a type on the network and the deviation may be a difference between a first count of the number of entities saved in the first database and a second count of the number of entities saved in the second database. In some aspects, first parameter may be a first count of a number of entities of a type on the network, the second parameter may be a second count of the number of entities of the type on the network and the deviation may be a difference between the first count of the number of entities saved in the first database and the second count of the number of entities saved in the second database.

Alert monitor instructions 506, when executed by a processor (e.g., 502), may cause system 500 to transmit an alert containing the deviation. In some aspects, the system 50 may also include instructions to perform an operation to correct the deviation between the first and second parameter The foregoing disclosure describes a number of examples for server configuration troubleshooting. The disclosed examples may include systems, devices, computer-readable storage media, and methods for server configuration troubleshooting. For purposes of explanation, certain examples are described with reference to the components illustrated in FIGS. 1A-5. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1A-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method, comprising:
   storing, by a first switch, a first set of parameter values in a first time-series database of the first switch, wherein the first switch is configured to operate in a network based on the first set of parameter values;
   monitoring the first set of parameter values in the first time-series database based on a set of conditions indicating the operation of the first switch in the network;
   receiving, periodically, a second set of parameter values of a second time-series database of a second switch;
   synchronizing the first time-series database with the second time-series database based on the second set of parameter values;
   determining, based on the synchronization, that a deviation between a first parameter value in the first time-series database and a second parameter value of the second set of parameter values exceeds a threshold, wherein the first and second parameter values indicate a same network configuration; and
   generating an alert indicating the deviation.

2. The method of claim 1, further comprising:
   performing an operation to correct the deviation between the first and second parameter values.

3. The method of claim 1, further comprising:
   retrieving, from the first time-series database, respective historical values corresponding to the first and second parameter values;
   determining a historical comparison between historical values corresponding the first parameter value and historical values corresponding to the second parameter value; and
   comparing the historical comparison to the deviation.

4. The method of claim 1, wherein the first parameter value indicates a first count of a type of entities in the network, the second parameter value indicates a second count of the type of entities in the network, and the deviation is a difference between the first count and the second count.

5. The method of claim 1, wherein the first parameter value indicates a first route between a first device and a second device in the network, and the second parameter value indicates a second route between the first and the second devices, and wherein the deviation is a difference in the first route and the second route.

6. The method of claim 1, further comprising maintaining, for the first switch, a subscription to the second time-series database for receiving data related to the second parameter value.

7. The method of claim 1, wherein both the first and the second switches are configured, via the first and second time-series databases, respectively, to actively manage the network.

8. The method of claim 1, wherein the first and the second switches are configured to appear as a virtual switch.

9. The method of claim 1, comprising:
   receiving a user generated script identifying the first parameter value;
   determining that the second parameter value corresponds to the first parameter value based on the user generated script; and
   executing the user generated script on the first switch.

10. A system, comprising:
    a processor,
    a memory device;
    a storage device configured to store a first set of parameter values in a first time-series database, wherein the system is configured to operate in a network based on the first set of parameter values;
    a monitor configured to:
       monitor the first set of parameter values in the first time-series database based on a set of conditions indicating the operation of the first switch in the network;
       receive, periodically, a second set of parameter values of a second time-series database of a second system; and
       synchronizing the first time-series database with the second time-series database based on the second set of parameter values;
    a deviation handler configured to determine, based on the synchronization, that a deviation between a first parameter value in the first time-series database and a second parameter value of the second set of parameter values exceeds a threshold, wherein the first and second parameter values indicate a same network configuration; and
    an alert module configured to generate an alert indicating the deviation.

11. The system of claim 10, further comprising:
    an operation module configured to perform an operation to correct the deviation between the first and second parameter values.

12. The system of claim 10, further comprising:
    an historical value handler to:
       retrieve, from the first time-series database, respective historical values corresponding to the first and second parameter values;
       determine a historical comparison between historical values corresponding to the first parameter value and historical values corresponding to the second parameter value; and
       compare the historical comparison to the deviation.

13. The system of claim 10, further comprising:
    a script handler configured to:
       receive a user generated script identifying the first parameter value;

determine that the second parameter value corresponds to the first parameter value based on the user generated script; and
execute the user generated script on the system.

14. The system of claim 10, wherein the first parameter value indicates a first count of a type of entities in the network, the second parameter value indicates a second count of the type of entities in the network, and the deviation is a difference between the first count and the second count.

15. The system of claim 10 wherein the first parameter value indicates a first route between a first device and a second device in the network, the second parameter value indicates a second route between the first and the second devices, and wherein the deviation is a difference in the first route and the second route.

16. A non-transitory machine-readable storage medium encoded with instructions, the instructions executable by a processor of a network system to cause the network system to:
store a first set of parameter values in a first time-series database of the network system, wherein the network system is configured to operate in a network based on the first set of parameter values;
monitor the first set of parameter values in the first time-series database based on a set of conditions indicating the operation of the first switch in the network;
receive, periodically, a second set of parameter values of a second time-series database of a second network system;
synchronize the first time-series database with the second time-series database based on the second set of parameter values;
determine, based on the synchronization, that a deviation between a first parameter value in the first time-series database and a second parameter value of the second set of parameter values exceeds a threshold, wherein the first and second parameter values indicate a same network configuration; and
generate an alert indicating the deviation.

17. The non-transitory machine-readable storage medium of claim 16, wherein the instructions executable by the processor of the network system to cause the network system to maintain a subscription to the second time-series database for receiving data related to the second parameter value.

18. The non-transitory machine-readable storage medium of claim 16, wherein both the first and the second switches are configured, via the first and second time-series databases, respectively, to actively manage the network.

19. The non-transitory machine-readable storage medium of claim 16, wherein the first and the second switches are configured to appear as a virtual switch.

20. The non-transitory machine-readable storage medium of claim 16, wherein the first parameter value indicates a first count of a type of entities in the network system, the second parameter value indicates a second count of the type of entities in the network, and the deviation is a difference between the first count and the second count.

* * * * *